(12) United States Patent
Baker

(10) Patent No.: US 8,469,447 B2
(45) Date of Patent: Jun. 25, 2013

(54) VEHICLE SEAT AND SUBWOOFER ENCLOSURE SEAT SUPPORT STRUCTURE

(75) Inventor: Alex Wade Baker, Ostrander, OH (US)

(73) Assignee: Honda Motor Co., Ltd., Tokyo (JP)

( * ) Notice: Subject to any disclaimer, the term of this patent is extended or adjusted under 35 U.S.C. 154(b) by 262 days.

(21) Appl. No.: 13/015,199

(22) Filed: Jan. 27, 2011

(65) Prior Publication Data

US 2012/0193956 A1 Aug. 2, 2012

(51) Int. Cl.
*A47C 7/62* (2006.01)

(52) U.S. Cl.
USPC .................................. 297/217.5; 297/217.3

(58) Field of Classification Search
USPC ................. 297/217.3, 217.4, 217.5
See application file for complete search history.

(56) References Cited

U.S. PATENT DOCUMENTS

| | | |
|---|---|---|
| 5,193,118 A | 3/1993 | Latham-Brown et al. |
| 6,463,160 B1 | 10/2002 | Tracy |
| 6,493,455 B1 | 12/2002 | Tracy |
| 7,724,915 B2 | 5/2010 | Maysumura et al. |
| 2005/0213786 A1 | 9/2005 | Kerneis |
| 2009/0315363 A1 | 12/2009 | Ganti et al. |

FOREIGN PATENT DOCUMENTS

| | | |
|---|---|---|
| EP | 0 904 985 | 7/2002 |
| EP | 1 266 799 | 12/2004 |
| WO | WO 94/10880 | 5/1994 |

*Primary Examiner* — Sarah B McPartlin
(74) *Attorney, Agent, or Firm* — Fay Sharpe LLP

(57) ABSTRACT

A vehicle seat includes a subwoofer enclosure seat support structure and a seat cushion supported on the subwoofer enclosure seat support structure. The subwoofer enclosure seat support structure includes a shell including a base, a seat cushion support wall connected to the base, and an internal space defining a subwoofer enclosure volume. The seat cushion is supported on the seat cushion support wall. A subwoofer speaker is connected to the shell. The seat cushion support wall of the shell includes at least one concave submarine protection layout recess adapted to accommodate compression of the seat cushion when the seat cushion is compressed by a seat occupant supported thereon during a collision. The seat comprises one or more cushion mounting brackets connected to the base of the shell by bracket support channels connected to or defined as part of the shell adjacent a front of the base. Alternatively, the cushion mounting brackets are defined as part of the shell by a polymeric or other structure.

14 Claims, 5 Drawing Sheets

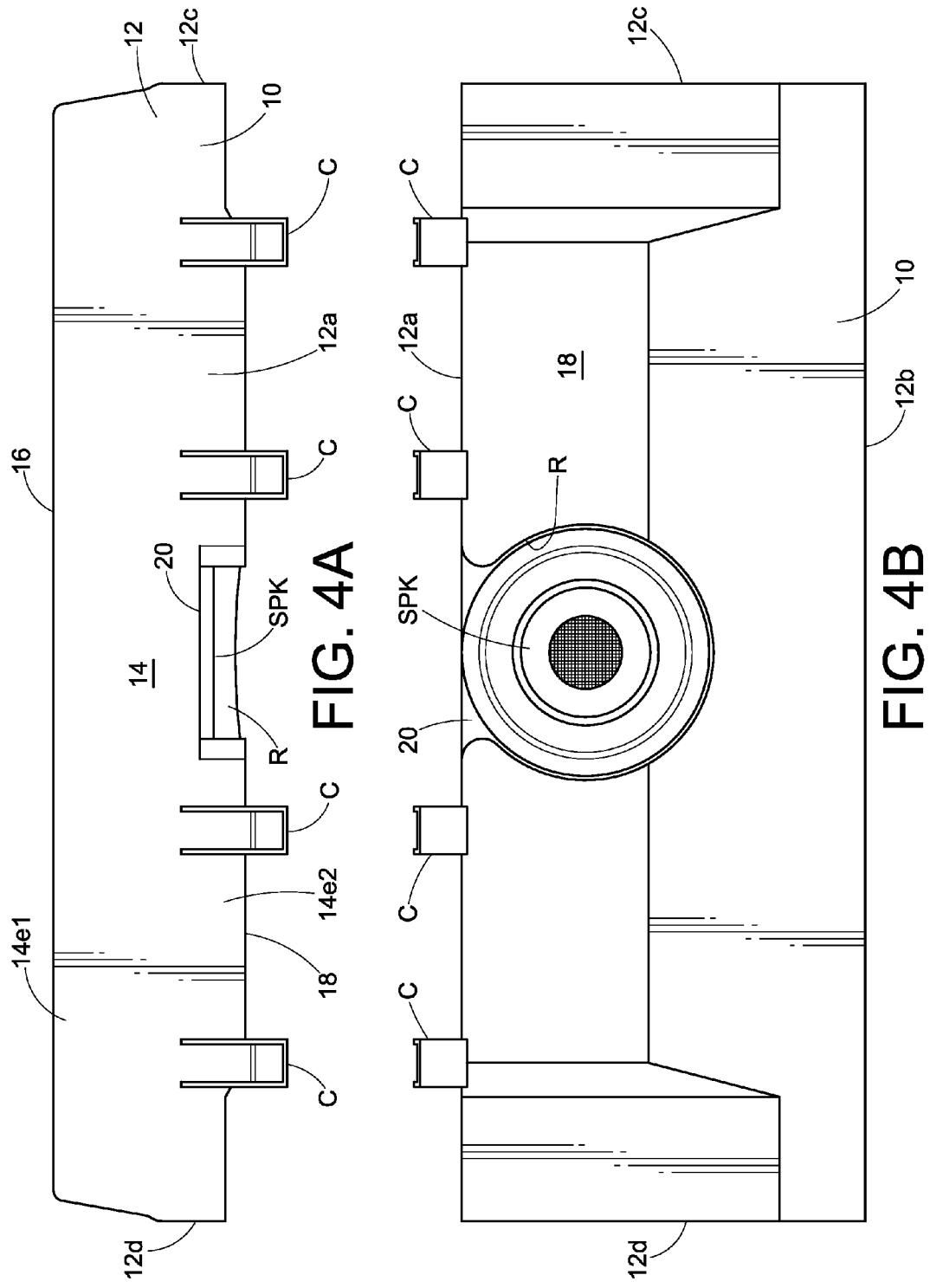

VEHICLE SEAT AND SUBWOOFER ENCLOSURE SEAT SUPPORT STRUCTURE

BACKGROUND

It is known to locate a subwoofer enclosure for a vehicle sound systems beneath one of the vehicle seats. In these prior systems, the subwoofer enclosure is separate from the load bearing support frame or other support structure of the vehicle seat. This leads to a suboptimal arrangement in which the volume of the subwoofer enclosure is not optimized or maximized with respect to the volume available under the vehicle seat and/or the space under only a single seat is used when additional empty space is available for use under an adjacent seat. Also, the subwoofer speaker, itself, is often not optimally located relative to the seat, the floor, and other surrounding structures of the vehicle. Also, prior systems do not allow the structure of the subwoofer enclosure to be used to increase the safety of the occupant of the seat under which the subwoofer enclosure is located.

SUMMARY

In accordance with one exemplary embodiment, a vehicle seat includes a subwoofer enclosure seat support structure and a seat cushion supported on the subwoofer enclosure seat support structure. The subwoofer enclosure seat support structure includes a shell comprising a base, a seat cushion support wall connected to the base, and an internal space defining a subwoofer enclosure volume. The seat cushion is supported on the seat cushion support wall of the shell. A subwoofer speaker is connected to the shell.

In accordance with a another exemplary embodiment, the shell further comprises a recess that opens through both a side wall and a floor, wherein at least part of the recess is defined by a subwoofer support wall to which the subwoofer speaker is connected.

In accordance with another exemplary embodiment, the seat cushion support wall of the shell includes at least one concave submarine protection layout recess adapted to accommodate compression of the seat cushion when the seat cushion is compressed by a seat occupant supported thereon.

In accordance with another exemplary embodiment, the seat comprises a cushion mounting bracket connected to the base of the shell, and the seat cushion is connected to the bracket. The bracket includes first and second legs that are respectively retained and received in first and second bracket support channels connected to the shell adjacent a front of the base.

BRIEF DESCRIPTION OF THE DRAWINGS

FIGS. 4A, 4B, 4C and 4D are respective front, bottom, side and isometric views of the subwoofer enclosure seat support structure of FIG. 2 (not including the seat cushion mounting brackets).

DETAILED DESCRIPTION

Figure 1:
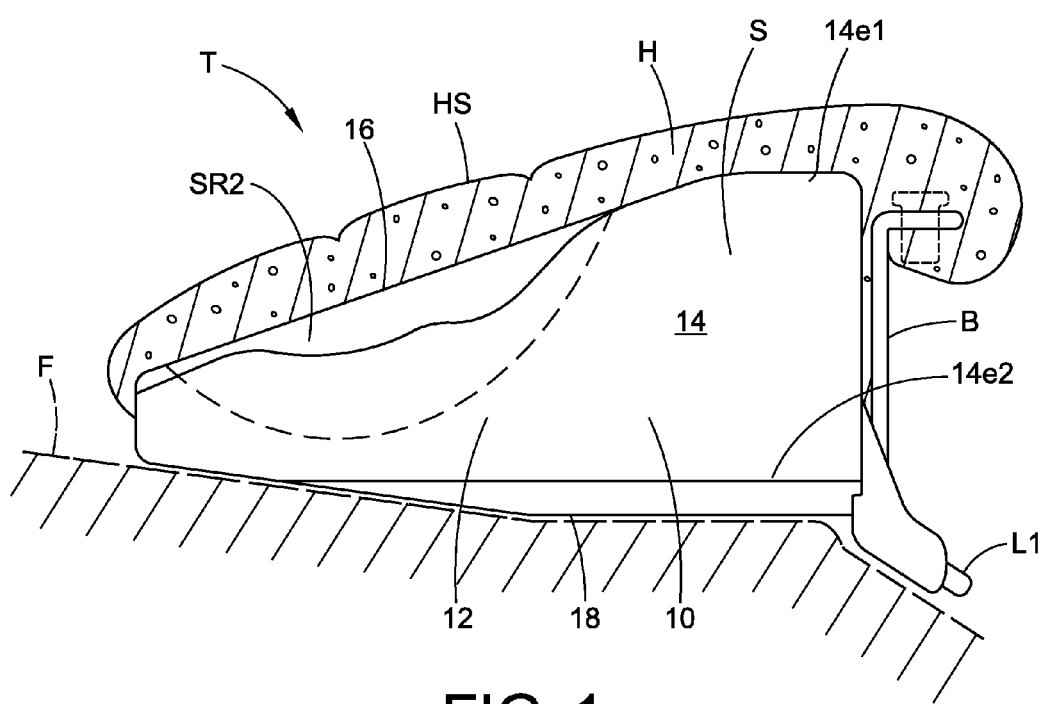
FIG. 1 is a side view of a vehicle seat comprising a subwoofer enclosure seat support structure in accordance with an exemplary embodiment.
Figure 2:
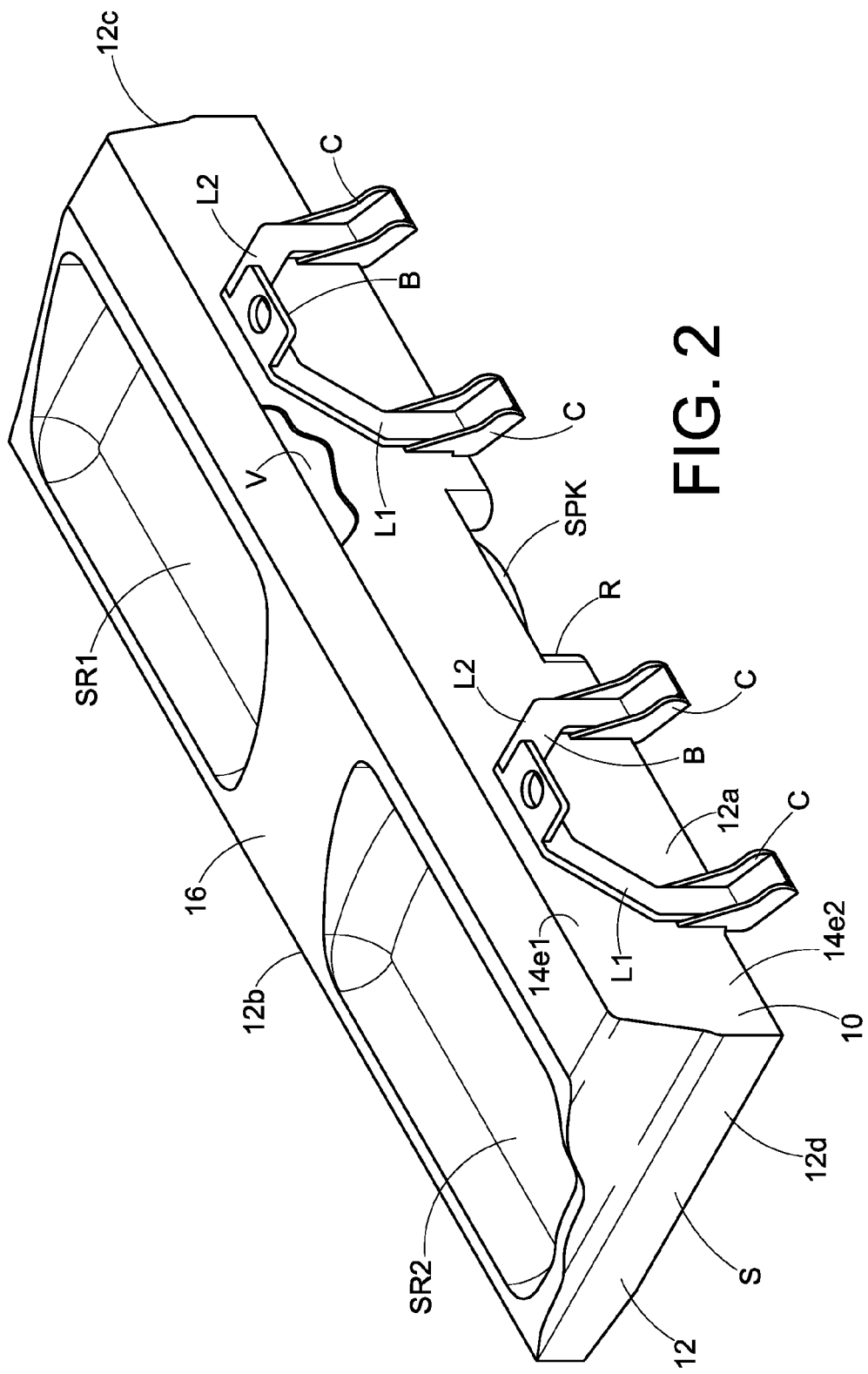
FIG. 2 is a front isometric view of the subwoofer enclosure seat support structure of FIG. 1.
Figure 3:
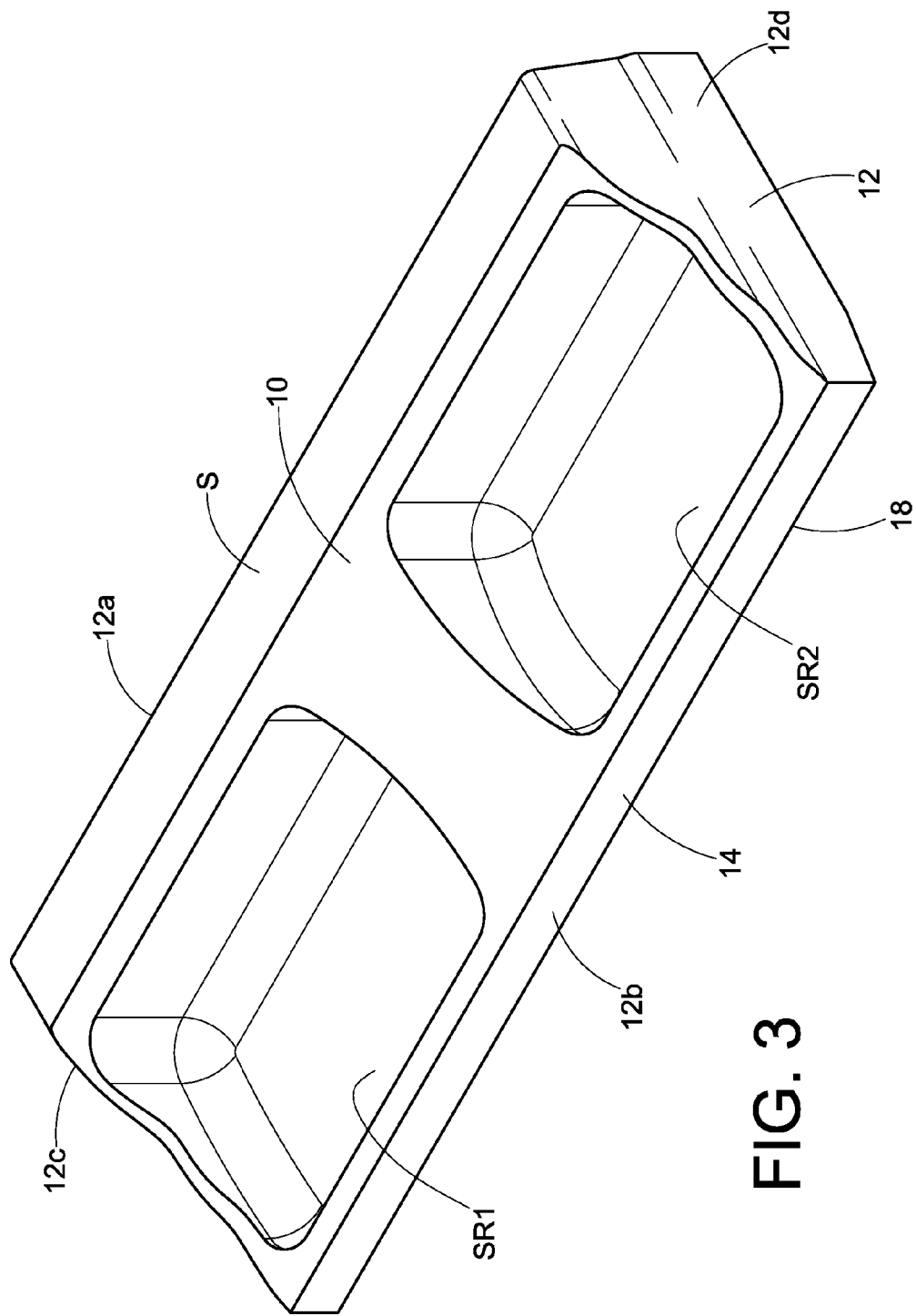
FIG. 3 is a rear isometric view of the subwoofer enclosure seat support structure of FIG. 1.
Figure 4C:
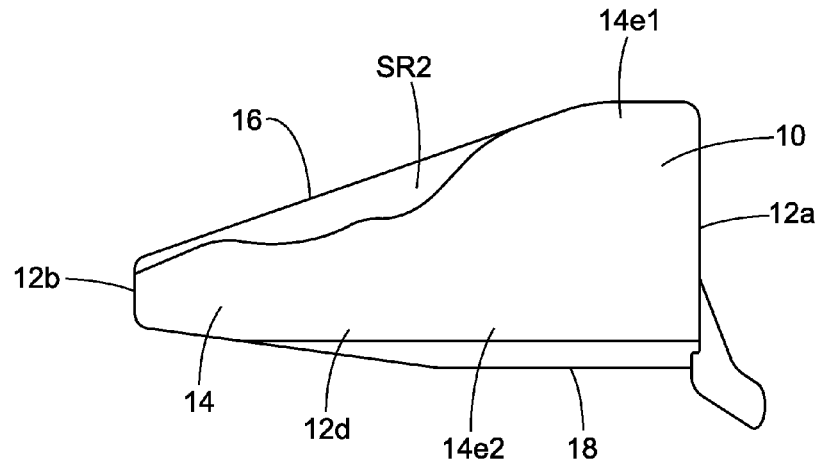
Figure 4D:
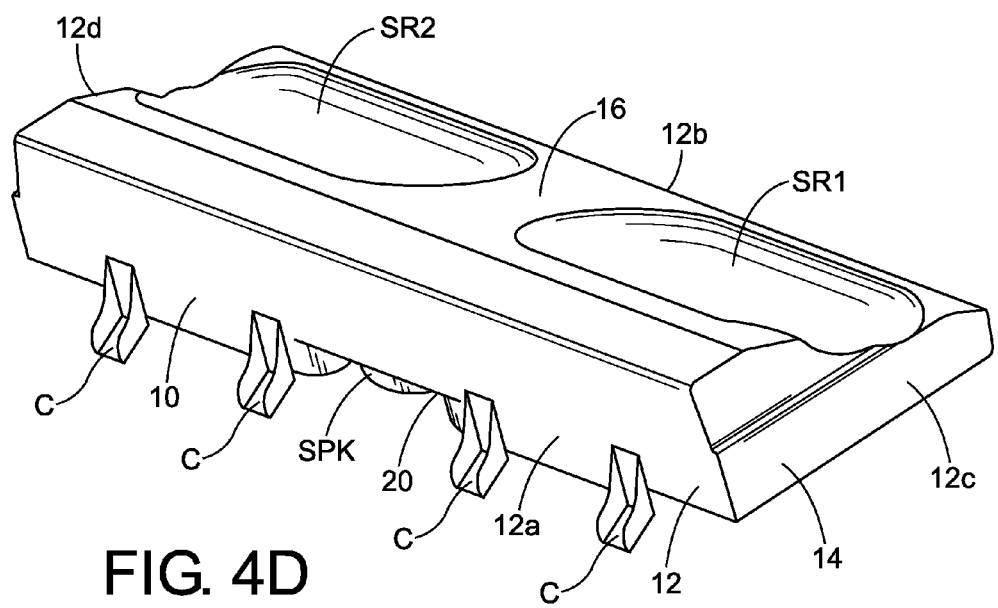

FIG. 1 is a side view of a vehicle seat T including a subwoofer enclosure seat support structure S in accordance with an exemplary embodiment. The seat T comprises a seat cushion H supported on and connected to the subwoofer enclosure seat support structure S. The seat cushion H is defined from foam or another suitable material and includes an upper or outer surface HS on which one or more vehicle occupants are seated. Unlike prior subwoofer enclosures that are simply installed or placed under a vehicle seat that includes a support frame that is separate from the subwoofer enclosure, a vehicle seat T formed in accordance with the exemplary embodiment uses the subwoofer enclosure seat support structure S as the primary support structure for the seat cushion H. In the exemplary embodiment, the seat T is a fixed, third-row vehicle seat that is dimensioned to accommodate at least two side-by-side vehicle passengers.

Referring also to FIGS. 2, 3, and 4A-4D, the subwoofer enclosure seat support structure S comprises a shell 10 defined as a one-piece structure as a molded polymeric construction or as a one-piece fiberglass or other reinforced composite structure, or as a one-piece metal structure. Alternatively, the shell 10 comprises a two-piece or other multi-piece assembly constructed from multiple components that are assembled together to form the shell. The shell 10 comprises a base 12 that is supported on the floor or other vehicle structure F (FIG. 1). The base 12 includes a side wall 14 that extends uninterrupted and continuously around and defines the base 12 to have a front side 12a, a rear side 12b, and opposite left and right lateral sides 12c,12d.

The shell 10 also includes a seat cushion support wall 16 connected to the base 12 and arranged transverse relative to the side wall 14. The seat cushion support wall 16 includes an outer surface on which the seat cushion H is supported. The seat cushion support wall 16 is connected to the upper end 14e1 of the side wall 14 and extends between the front side 12a, rear side 12b and left and right sides 12c,12d of the base. The side wall 14 has greater height at the front side 12a of the base 12 as compared to the rear side 12b of the base. As such, the seat cushion support wall 16 slopes or is inclined from the front side 12a of the base toward the rear side 12b of the base.

The shell 10 further comprises a floor 18 that is arranged transverse to the side wall 14 and connected to the lower edge 14e2 of the side wall so as to be spaced from the seat cushion support wall 16. The floor 18 is either defined with the shell 10 as part of its one-piece construction or is separately constructed and then affixed to the side wall 14 so as to become part of the shell 10. A substantially hollow internal space V (FIG. 2) provides a subwoofer enclosure volume defined inside the shell 10, between the side wall 14, the seat cushion support wall 16, and the floor 18.

The base 12 of the shell 10 further comprises a subwoofer support wall 20 that is arranged transverse to the side wall 14 at a location spaced between said seat cushion support wall 16 and the lower edge 14e2 of the side wall 14. A subwoofer mounting opening is defined in the subwoofer support wall and a subwoofer speaker SPK is mounted in the opening and fixedly secured to the shell 10 using fasteners or the like so that the speaker SPK separates the internal space V from the external environment surrounding the shell 10.

The shell defines a subwoofer recess R that is partially defined by the subwoofer support wall 20. The recess R opens in both the side wall 14 and the floor 18 at the front side 12a of the base 12, and the subwoofer support wall 20 is arranged so that it faces toward the lower edge 14e2 of the side wall 14. The subwoofer support wall 20 is located such that the installed subwoofer speaker SPK is spaced from the floor 18 and the vehicle floor F. As noted, the recess R also opens through the side wall 14 at the front side 12a of the base 12, which ensures that an open space is present between the subwoofer speaker SPK and the passenger compartment of the vehicle in which the subwoofer enclosure seat support structure S is installed. The arrangement of the subwoofer support wall 20 transverse to the side wall 14 and within and partially defining the recess R conceals the subwoofer speaker SPK and protects it from dirt, water, and physical damage.

The subwoofer enclosure seat support structure S further comprises at least one and preferably at least first and second cushion mounting brackets B (FIG. 2) connected to the base 12 of the shell 10, or the one or more cushion mounting brackets B are defined as part of the shell 10, e.g., as a polymeric construction. The seat cushion H is connected to each bracket B using suitable fasteners or other fastening elements. The brackets B are secured to the base 12 using fasteners or other fastening elements. In the exemplary embodiment, each bracket B is provided as a U-shaped stamped metal or like structure including first and second spaced-apart legs L1,L2. For each bracket B, the base 12 comprises first and second spaced-apart bracket support channels C that are connected to and/or defined as part of the side wall 14 at the front 12a of the base. The first and second legs L1,L2 of each bracket B are respectively received and retained in the first and second bracket support channels C. Fasteners or other fastening elements are used to secure the legs L1,L2 in their respective channels C, and the same fasteners or different fasteners can also be used to anchor the channels C to the vehicle floor F to secure or at least locate the subwoofer enclosure seat support structure S in its operative position. As such, the base 12 comprises a plurality of bracket support channels C that project outwardly from the side wall 14 adjacent said front side 12a of the base 12, and each of the first and second cushion mounting brackets B comprises spaced-apart legs L1,L2 that are respectively received and retained in the bracket support channels C. The first and second brackets B are located respectively on first and second opposite sides of the recess R in which the subwoofer speaker SPK is located.

As noted above, the subwoofer enclosure seat support structure S replaces the separate seat frame found in prior vehicle seating arrangements. As such, the subwoofer enclosure seat support structure S is particularly adapted to provide the required comfort and safety of a vehicle seat. In this regard, the shell 10 is constructed such that the seat cushion support wall 16 includes a respective concave submarine layout protection recess SR1,SR2 defined therein and associated respectively with each primary seating position provided by the vehicle seat T. In the exemplary embodiment, the vehicle seat T provided two separate seating positions, so the seat cushion support wall 16 correspondingly includes and defines first and second spaced apart concave submarine layout protection recesses SR1,SR2 laterally separated from each other and connected by a central section of the seat cushion support wall 16. Each submarine layout protection recess SR1,SR2 is structured and located to accommodate compression of the seat cushion H when the seat cushion is compressed by a seat occupant supported on the cushion during a collision or other sudden deceleration. In this manner, the seat occupant sinks into the seat cushion H and sinks into the respective submarine layout protection recess SR1, SR2 which helps maintain the seat occupant in a favorable seating position during a collision or other emergency maneuver of the vehicle in which the seat T is installed.

The disclosure has been described with reference to the exemplary embodiments. Modifications and alterations will occur to others upon reading and understanding the preceding detailed description, and it is intended that the disclosure be construed as including all such modifications and alterations in so far as they come within the scope of the appended claims or the equivalents thereof.

The invention claimed is:

1. A vehicle seat comprising:
 a subwoofer enclosure seat support structure and a seat cushion supported on said subwoofer enclosure seat support structure, said subwoofer enclosure seat support structure comprising:
 a shell comprising a base including a side wall defining a periphery of said shell, a seat cushion support wall arranged transversely relative to said side wall and connected to said side wall, and an internal space defining a subwoofer enclosure volume between said side wall and said seat cushion support wall, wherein said seat cushion is supported on said seat cushion support wall of said shell outside said internal space, said base further comprising a subwoofer support wall arranged transverse to said side wall and located between said seat cushion support wall and a lower edge of said side wall;
 a subwoofer recess that opens in said side wall of said shell, wherein said transverse subwoofer support wall partially defines said subwoofer recess;
 a subwoofer speaker connected to said transverse subwoofer support wall of said shell and located in said subwoofer recess, wherein said subwoofer speaker separates said subwoofer enclosure volume from an external environment in which said shell is located;
 said seat cushion support wall comprising first and second concave submarine layout protection recesses adapted to accommodate compression of first and second portions of said seat cushion when said first and second portions of said seat cushion are compressed, wherein said first and second submarine layout protection recesses are separated by a portion of said seat cushion support wall that extends between and interconnects said first and second submarine layout protection recesses.

2. The vehicle seat as set forth in claim 1, wherein said base of said shell further comprises a floor arranged transverse to said side wall and connected to said side wall adjacent said lower edge of said side wall such that said floor is spaced from said seat cushion support wall, wherein said subwoofer recess opens in both said side wall and said floor on a front side of said base such that said subwoofer speaker is open to said external environment through said recess.

3. The vehicle seat as set forth in claim 2, wherein said side wall of said base, said seat cushion support wall and said subwoofer support wall are all part of a single one-piece construction.

4. The vehicle seat as set forth in claim 3, wherein said floor of said shell is defined as part of said one-piece construction.

5. The vehicle seat as set forth in claim 1, wherein said side wall defines a first height at a front of said base and a second height that is less than said first height at a rear of said base and wherein said seat cushion support wall is sloped between said front of said base and said rear of said base.

6. The vehicle seat as set forth in claim 5, further comprising a cushion mounting bracket connected to said base, wherein said seat cushion is connected to said bracket.

7. The vehicle seat as set forth in claim 6, wherein said base comprises first and second spaced-apart bracket support channels that project outwardly from said side wall and wherein said cushion mounting bracket comprises first and second legs that are received and retained in said first and second bracket support channels, respectively.

8. The vehicle seat as set forth in claim 5, further comprising first and second cushion mounting brackets connected to said base, wherein said seat cushion is connected to said brackets.

9. The vehicle seat as set forth in claim 8, wherein said base comprises a plurality of bracket support channels that project outwardly from said side wall adjacent a front of said base, and wherein each of said first and second cushion mounting brackets comprises spaced-apart legs, each of which is received and retained in a respective one of said bracket support channels.

10. The vehicle seat as set forth in claim 9, wherein said first and second brackets are located respectively on first and second opposite sides of said subwoofer recess.

11. The vehicle seat as set forth in claim 1, wherein said side wall of said base, said seat cushion support wall and said transverse subwoofer support wall are assembled together from multiple pieces to define said shell.

12. A vehicle seat comprising:
   a subwoofer enclosure seat support structure and a seat cushion supported on said subwoofer enclosure seat support structure, said subwoofer enclosure seat support structure comprising:
   a shell comprising a base, a seat cushion support wall connected to said base, and an internal space defining a subwoofer enclosure volume, wherein said seat cushion is supported on said seat cushion support wall of said shell;
   said seat cushion support wall comprising first and second concave submarine layout protection recesses adapted to accommodate compression of first and second portions of said seat cushion when said first and second portions of said seat cushion are compressed, wherein said first and second submarine layout protection recesses are separated by a portion of said seat cushion support wall that extends between and interconnects said first and second submarine layout protection recesses;
   said side wall defining a first height at a front of said base and a second height that is less than said first height at a rear of said base, wherein said seat cushion support wall is sloped between said front of said base and said rear of said base;
   said shell comprising a subwoofer recess defined in said side wall at said front of said base;
   a subwoofer speaker connected to said shell and located in said subwoofer recess;
   a cushion mounting bracket connected to said base, wherein said seat cushion is connected to said bracket;
   wherein said base comprises first and second spaced-apart bracket support channels that project outwardly from said side wall and wherein said cushion mounting bracket comprises first and second legs that are received and retained in said first and second bracket support channels, respectively.

13. A vehicle seat comprising:
   a subwoofer enclosure seat support structure and a seat cushion supported on said subwoofer enclosure seat support structure, said subwoofer enclosure seat support structure comprising:
   a shell comprising a base, a seat cushion support wall connected to said base, and an internal space defining a subwoofer enclosure volume, wherein said seat cushion is supported on said seat cushion support wall of said shell;
   said seat cushion support wall comprising first and second concave submarine layout protection recesses adapted to accommodate compression of first and second portions of said seat cushion when said first and second portions of said seat cushion are compressed, wherein said first and second submarine layout protection recesses are separated by a portion of said seat cushion support wall that extends between and interconnects said first and second submarine layout protection recesses;
   said side wall defining a first height at a front of said base and a second height that is less than said first height at a rear of said base, wherein said seat cushion support wall is sloped between said front of said base and said rear of said base;
   said shell comprising a subwoofer recess defined in said side wall at said front of said base;
   a subwoofer speaker connected to said shell and located in said subwoofer recess;
   first and second cushion mounting brackets connected to said base, wherein said seat cushion is connected to said brackets;
   wherein said base comprises a plurality of bracket support channels that project outwardly from said side wall adjacent said front of said base, and wherein each of said first and second cushion mounting brackets comprises spaced-apart legs, each of which is received and retained in a respective one of said bracket support channels.

14. The vehicle seat as set forth in claim 13, wherein said first and second brackets are located respectively on first and second opposite sides of said subwoofer recess.

\* \* \* \* \*